(12) United States Patent
Hawkins

(10) Patent No.: US 6,447,871 B1
(45) Date of Patent: Sep. 10, 2002

(54) COMPOSITE MATERIALS WITH EMBEDDED MACHINES

(75) Inventor: Gary F. Hawkins, Torrance, CA (US)

(73) Assignee: The Aerospace Corporation, El Segundo, CA (US)

(*) Notice: Subject to any disclaimer, the term of this patent is extended or adjusted under 35 U.S.C. 154(b) by 0 days.

(21) Appl. No.: 09/407,039

(22) Filed: Sep. 27, 1999

(51) Int. Cl.[7] .................................................. B32B 5/08
(52) U.S. Cl. ........................ 428/67; 428/332; 428/364; 428/369; 428/374
(58) Field of Search ............................... 428/67, 292.1, 428/293.1, 293.4, 293.7, 295.1, 295.4, 295.7, 297.4, 298.1, 298.4, 323, 327, 332, 364, 369, 374

(56) References Cited

U.S. PATENT DOCUMENTS

| | | | |
|---|---|---|---|
| 4,624,880 A | * | 11/1986 | Goulding et al. |
| 5,019,439 A | | 5/1991 | Momose |
| 5,128,200 A | | 7/1992 | Colley et al. |
| 5,138,776 A | | 8/1992 | Levin |
| 5,254,387 A | | 10/1993 | Gallucci |
| 5,256,223 A | | 10/1993 | Alberts et al. |
| 5,400,296 A | | 3/1995 | Cushman et al. |
| 5,573,824 A | | 11/1996 | Klocek et al. |
| 5,826,350 A | | 10/1998 | Wallerstein |

* cited by examiner

Primary Examiner—Deborah Jones
Assistant Examiner—Jennifer McNeil
(74) Attorney, Agent, or Firm—Lyon & Lyon LLP

(57) ABSTRACT

A composite material is provided that includes a matrix material, and a plurality of deflectable elements or "machines" disposed in the matrix material, the machines acting to modify one or more physical properties of the composite material in response to forces acting upon the composite material. Preferably, the machines have an elongate shape defining a longitudinal axis, which are disposed within the matrix material in a predetermined array. The elongate members have an asymmetrical cross-section which is deflectable between first and second shapes, and consequently the composite material exhibits different physical properties because the elongate members deflect between the first and second shapes. The machines may include a variety of asymmetrical cross-sections, such as a generally "Z" shape, an hourglass shape, a cantilever shape or a leaf spring shape.

23 Claims, 5 Drawing Sheets

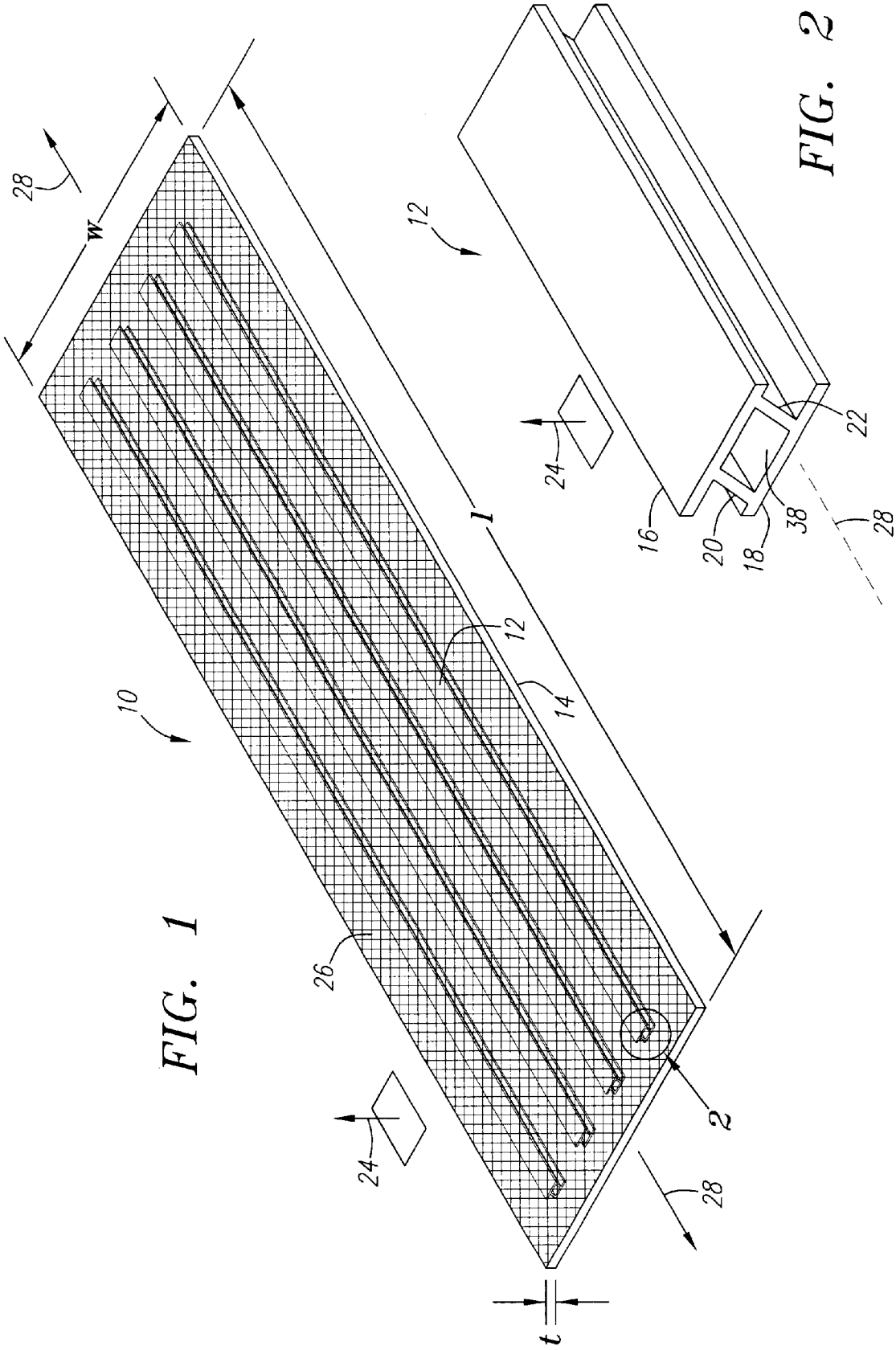

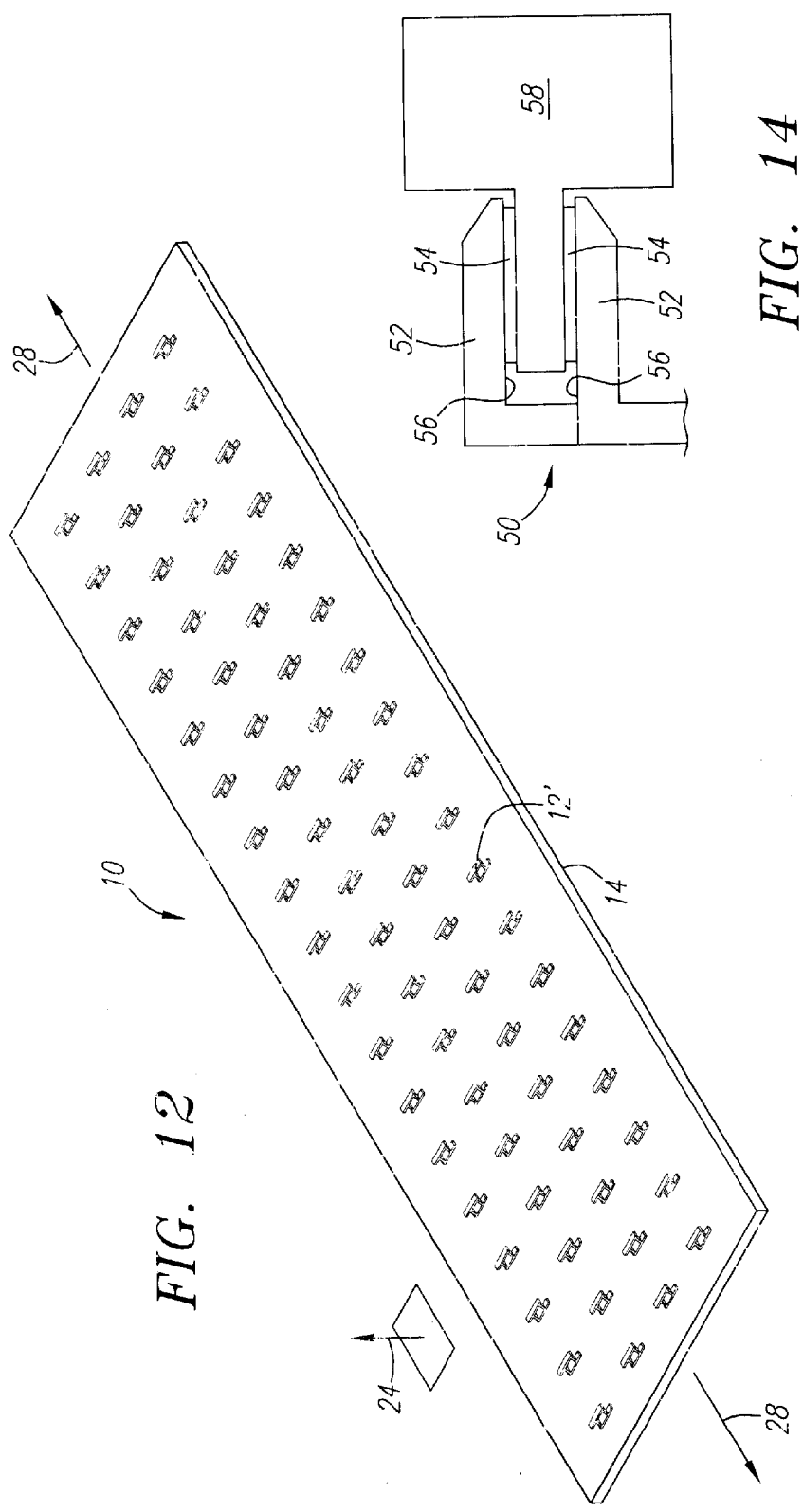
FIG. 12
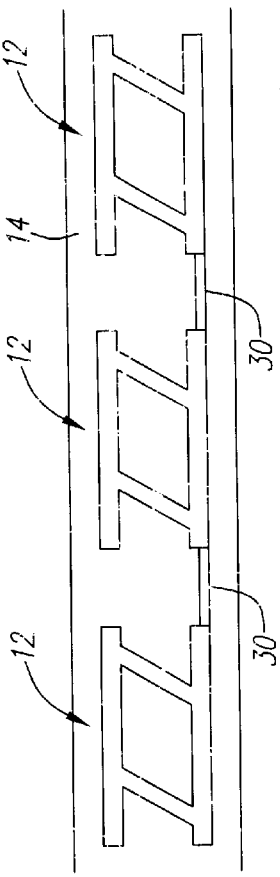
FIG. 14
FIG. 13

COMPOSITE MATERIALS WITH EMBEDDED MACHINES

FIELD OF INVENTION

The present invention relates generally to composite materials, and more particularly to composite materials including machines embedded in a polymeric matrix material.

BACKGROUND

Many composite materials have been suggested as an alternative to traditional materials, such as metal or wood. Generally, such materials include fabric or strands of fiber, such as kevlar, carbon or glass, that are impregnated within a binding matrix, such as an epoxy resin. The strands are arranged within the matrix in a predetermined orientation to provide desired physical properties for the material. For example, composite materials are often designed to provide increased rigidity and strength at substantially less weight as compared to traditional materials.

Composite honeycomb materials have also been suggested which include a honeycomb core sandwiched between two skins. The honeycomb material may be formed from plastic, metal or fiber reinforced plastic, which may also provide enhanced structural properties at substantially less weight as compared to traditional materials. Foam-core structures formed from a variety of plastics or fiber reinforced plastics have also been suggested, which have similar properties to honeycomb materials.

One disadvantage of composite materials is that their physical properties are generally considered to be "passive," i.e., their physical properties remain substantially constant during their use. Stated differently, the physical properties of the materials do not change substantially as they are subjected to loads, until the materials begin to plastically strain and/or fail. Thus, although composite materials may provide enhanced rigidity as compared to traditional materials, their physical properties may not be programmed to respond to changing conditions during their use in an article.

To further modify the properties of composite materials, particles may be introduced into the matrix, such as sand, weighting agents or powders, and microballoons. Such particles, however, do not generally allow the properties of the material to change during use, as may be desirable for certain applications, but merely change the initial properties of the material, such as density or rigidity.

For this reason, "active" materials have been suggested which respond to external stimuli to change one or more physical properties of the material. For example, shape memory alloys, such as those of Nickel and Titanium ("Nitinol" alloys), may be designed to respond to heat to change the shape of an article formed from the shape memory material. The article may have an initial shape programmed at a higher temperature (for example, in an austenitic phase), and then cooled (for example, to a martensitic phase), whereupon the article may be malleably deformed from the initial shape. During or after its use, the article may be heated until it exceeds a transition temperature (for example, returning to the austenitic phase), whereupon the article may revert automatically back to its initial shape.

Piezo-electric materials have also been suggested, which respond to the application of electricity. The material may have an initial set of physical properties when not subjected to an electric potential. When an electrical potential is applied across the material, it may change shape and/or exhibit a second set of physical properties. Each set of physical properties may be selected for different operating conditions which the material may encounter during its use.

Active materials, however, require the application of external energy, such as heat or electricity, in order to invoke a change in the materials. Such energy may interfere with other performance aspects of an article made from the material, or may affect other systems with which the article is interacting. Further, such materials fail to respond to changing operating conditions, but are generally limited to two discrete property sets.

Accordingly, it is believed that a composite material exhibiting physical properties that change in response to changing operating conditions and/or which provides improved physical properties would be considered useful.

SUMMARY OF THE INVENTION

The present invention is directed to composite materials having machines embedded in a matrix material. In accordance with one aspect of the present invention, a composite material is provided that includes a matrix material, and a plurality of machines disposed in the matrix material, the plurality of machines acting to modify one or more physical properties of the composite material in response to forces acting upon the composite material. Preferably, the machines have a maximum cross-sectional dimension which is less than about 1 cm, and more preferably more than about 100 microns, with machines having a maximum cross-sectional dimension of about 1 mm being most preferred.

In a preferred form, the plurality of machines have an elongate shape defining a longitudinal axis, which are disposed within the matrix material in a predetermined array. The elongate members preferably have an asymmetrical cross-section which is deflectable between first and second shapes, wherein the composite material exhibits different physical properties as the elongate members deflect between the first and second shapes.

The machines may include a variety of asymmetrical cross-sections, such as a generally "Z" shape, an hourglass shape, a cantilever shape or a leaf spring shape. These structures enable the machines to modify one or more physical properties of the composite material in a direction substantially transverse to the longitudinal axis.

In accordance with another aspect of the present invention, a composite material is provided with an array of deflectable members arranged in a predetermined configuration, and a matrix material substantially surrounding the array of deflectable members, the matrix material comprising a relatively soft material compared to the deflectable members. When the composite material is subjected to stress, one or more of the deflectable members deflect within the matrix material between first and second shapes.

In a preferred form, the array of deflectable members are disposed in a plane, such that the deflectable members are deflectable substantially transverse to the plane. For example, the deflectable members may include a cantilever beam structure and a stop portion for limiting movement of a free end of the cantilever beam structure.

In a further alternative, the deflectable members may include one or more transverse portions extending between opposing planar portions. The opposing planar portions may be movable relative to one another about the transverse portion. In one preferred form, the opposing planar portions and transverse portion define a generally "Z" shape for transferring a force acting upon the composite material between a tensile/compressive condition and a shear condition. In another preferred form, the transverse portions may be curved to define a generally hourglass shape, which may result in a material having a negative Poisson's Ratio.

In still another alternative, the deflectable members may include a base portion and a convex portion extending from the base portion, the convex portion being deflectable to a concave shape at a predetermined force. Upon removal of the force, the concave portion may return to its convex shape, thereby being able to store and release energy from the forces acting on the composite material.

A composite material in accordance with the present invention exhibits physical properties which cannot be attained with traditional "natural" materials. The machines embedded therein may have a predetermined cross-sectional shape which may be deflected when the material is subjected to certain forces. As the machines are deflected, the overall shape of the material may change, e.g., its thickness or width, and/or the structural properties of the material may change. Thus, the term "machine" as used herein refers to a structure which modifies the forces acting upon the overall material, for example, by diverting them in a different direction than the original forces and/or absorbing at least part of the forces acting upon the material. The "machine" may be at least partially semi-rigid and/or may be include one or more deflectable portions, thereby allowing the overall material to respond in a predetermined manner when subjected to forces and/or stress.

Other objects and features of the present invention will become apparent from consideration of the following description taken in conjunction with the accompanying drawings.

BRIEF DESCRIPTION OF THE DRAWINGS

For a better understanding of the invention, and to show how it may be carried into effect, reference will be made, by way of example, to the accompanying drawings, in which:

FIG. 1 is a perspective view of a single ply of a composite material having a plurality of elongate machine elements embedded therein, in accordance with the present invention.

FIG. 2 is a perspective detail of a first preferred embodiment of a machine element, having a "Z" shaped cross-section, for use in the composite material of FIG. 1.

FIG. 12 is a perspective view of a single ply of a composite material having a plurality of relatively short machine elements embedded therein, in accordance with the present invention.

FIG. 13 is a cross-sectional view of a plurality of "Z" shaped machine elements with connectors extending between adjacent machine elements.

FIG. 14 is a side view of a gripping mechanism including a pad of composite material on each jaw.

DETAILED DESCRIPTION OF THE PREFERRED EMBODIMENTS

Figure 3:
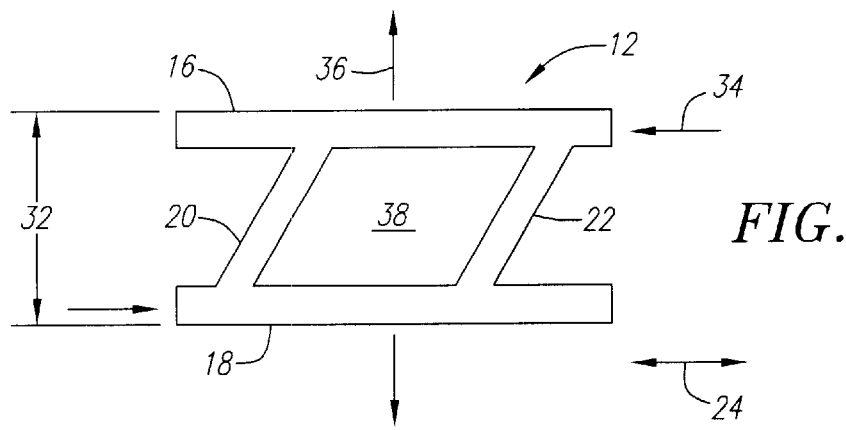
FIG. 3 is a cross-sectional view of the "Z" shaped machine element of FIG. 2, showing how shear stress is transformed into tensile strain.

Turning to the drawings, FIG. 1 shows a preferred embodiment of the present invention, namely a single ply 10 of composite material having a width w, a length 1, and a thickness t, and including a plurality of elongate machine elements 12 embedded in a matrix material 14. The machine elements 12 may be formed from semi-rigid materials using known processes, such as molding, machining, or extruding. In a preferred form, the machine elements 12 are elongate extrusions formed from nylon or polyvinyl chloride ("PVC"), having a length similar to the length 1 of the ply 10. Other materials which may be appropriate for the machine elements 12 include glass or metals, such as aluminum or steel.

The matrix material 14 may be cast around the machine elements 12, and may be formed from any castable material, preferably epoxy, although other polymers and plastics may also be used, such as polyester or vinylester resins. The matrix material 14 is preferably relatively soft and/or has a relatively low modulus compared to the material of the machine elements 12 to facilitate the deflection of the machine elements 12 therein and the modification of stresses in the ply 10 by the machine elements 12, as explained further below.

The machine elements 12 are preferably arranged in a predetermined array, for example, in a row arranged in a plane normal to arrow 24, i.e., substantially parallel to the upper surface 26 of the ply 10, with their length extending along longitudinal axis 28. The machine elements 12 may be initially bonded to a mesh carrier (not shown) to facilitate maintaining the machine elements 12 in the predetermined array within the matrix material 14. Appropriate materials for the mesh carrier include spunbonded polyester or a unidirectional ply of a traditional composite material.

Alternatively, as shown in FIG. 13, adjacent machine elements 12 may be connected to one another by connectors 30 extending generally parallel to the plane 24. The connectors 30 may be integrally extruded along with the machine elements 12, thereby more precisely setting the spacing of the machine elements 12 within the matrix material 14 and/or reducing the cost to manufacture individual machine elements 12. The connectors 30 may be substantially thinner than the portions making up the machine elements 12 to minimize impact on the performance of the machine elements 12. Alternatively, individual connectors (not shown) may be attached between adjacent machine elements 12 at desired intervals along the longitudinal axis 28.

The connectors 30 may be sufficiently thin and/or flexible to ensure that each machine element 12 acts independently from one another within the matrix material. Alternatively, the connectors 30 may result in the machine elements 12 being provided in banks that cooperate with one another in a predetermined manner.

Figure 5:
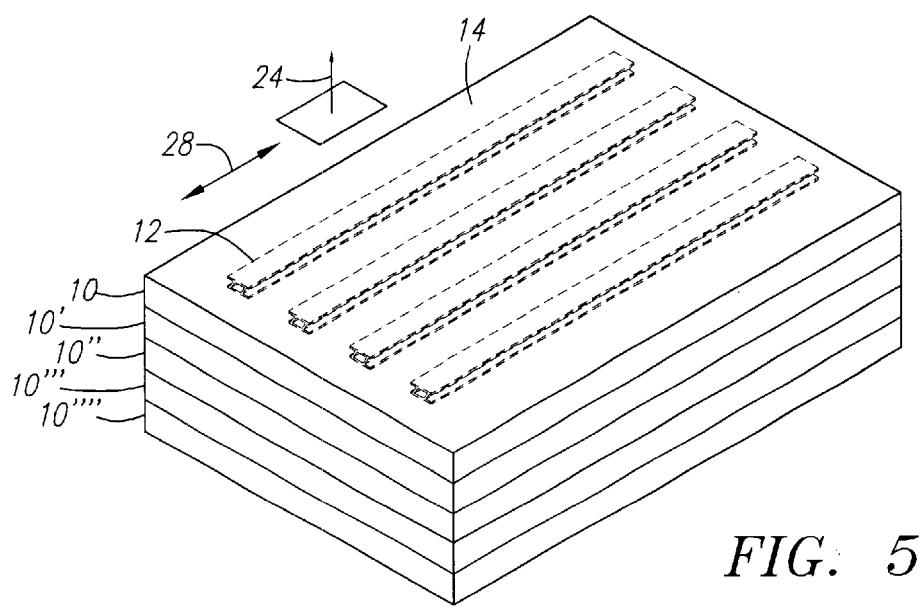
FIG. 5 is a perspective view of a composite structure formed from a plurality of the plies of FIG. 1.

In a further alternative, as shown in FIG. 5, the machine elements may be stacked on top of one another to provide a thicker ply of composite material prior to infiltration with matrix material and/or curing. Connectors may extend between adjacent machine elements to maintain the array. Alternatively, the viscous flow of the matrix material may be sufficient to maintain the machine elements in the array. In a further alternative, the machine elements may be formed from a magnetic material and aligned by curing the matrix material in the presence of a magnetic field.

Turning to FIG. 12, instead of elongate machine elements, a plurality of relatively short individual machine elements 12' may be arranged in the plane 24 and spaced apart along the longitudinal axis 28. Whether long or short in length, the machine elements 12 may have a maximum cross-sectional dimension, e.g., width or height, which is substantially smaller than a maximum dimension of a finished article made from the material and/or a thickness of the ply 10. In a preferred form, the machine elements 12 have a maximum cross-sectional dimension which is less than about 1 cm, preferably having a maximum cross-sectional dimension which is between about 100 microns and about 1 cm, more preferably between about 500 microns and about 5 mm, and most preferably about 1 mm. Such relatively small machine elements may also be referred to as "micromachines." A composite material in accordance with the present invention, however, is not limited to structures including micromachines, but may also include much larger structures within its scope, as will be appreciated by those skilled in the art.

If the machine elements 12 are relatively large, e.g., compared to the thickness of the ply 10 and/or the overall article (not shown) within which the ply 10 is incorporated, the article may not exhibit uniform properties and may result in localized stresses when the material is subjected to loads. Preferably, the maximum cross-sectional dimension of the machine elements 12 is less than ten percent of the thickness of the overall structure, and more preferably less than about one percent. This may ensure that the physical properties of the material behave substantially uniformly across the width of the material despite the material containing discrete machine elements. Thus, the machine elements and resulting materials in accordance with the present invention may be applied to a variety of structures independent of scale, from relatively small micromachine structures to large macro-structures, such as buildings or bridges, by appropriately selecting the size and density of the machine elements proportional to the finished article.

Once the machine elements 12 are arranged in the predetermined row or array, matrix material 14 is introduced around the machine elements 12 to substantially encapsulate the machine elements 12 therein using conventional processes. As shown in FIG. 5, after the matrix material 14 has cured, the resulting ply 10 may be bonded to additional similar plies 10'–10'"", and/or formed into desired shapes to be incorporated into finished articles. (not shown). Alternatively, thicker three-dimensional structures (not shown) may be formed using multiple rows of machine elements 12 stacked on top of one another, which are then infiltrated with matrix material 14 and/or cured together as a single structure.

The machine elements 12 may comprise between about 30 percent and about 70 percent by volume of the composite material, and more preferably between about 30 and about 50 percent. The percentage of machine content is generally defined by the desired final properties of the composite material. For example, increasing the machine content may increase the influence of the machine's behavior on the final properties of the composite material, while decreasing the machine content may dilute the influence of the machine elements, and emphasize the properties of the matrix material, as will be appreciated by those skilled in the art.

The resulting ply 10 exhibits physical properties which cannot be attained with traditional "natural" materials. The machine elements 12 may have a predetermined cross-sectional shape which may be deflected when the ply 10 is subjected to certain forces. As the machine elements 12 are deflected, the shape of the ply 10 may change, e.g., its thickness or width, and/or the structural properties of the ply 10 may change. Thus, the term "machine" as used herein refers to a structure which modifies the forces acting upon the overall material, for example, by diverting them in a different direction than the original forces and/or absorbing at least part of the forces acting upon the material. The "machine" may be at least partially semi-rigid and/or may be include one or more deflectable portions, thereby allowing the overall material to respond in a predetermined manner when subjected to forces and/or stress.

Turning to FIGS. 2 and 3, a first preferred embodiment of a machine element 12 is shown. The machine element 12 includes opposing planar portions 16, 18 and transverse portions 20, 22 extending between and connecting the planar portions 16, 18, thereby defining a generally "Z" shape. The machine element 12 is preferably arranged within the matrix material (not shown) such that the planar portions 16, 18 extend substantially parallel to the plane 24. The transverse portions 20, 22 act as hinges, whereby the planar portions 16, 18 may move relative to one another but remain substantially parallel to one another and the plane 24.

Figure 4:
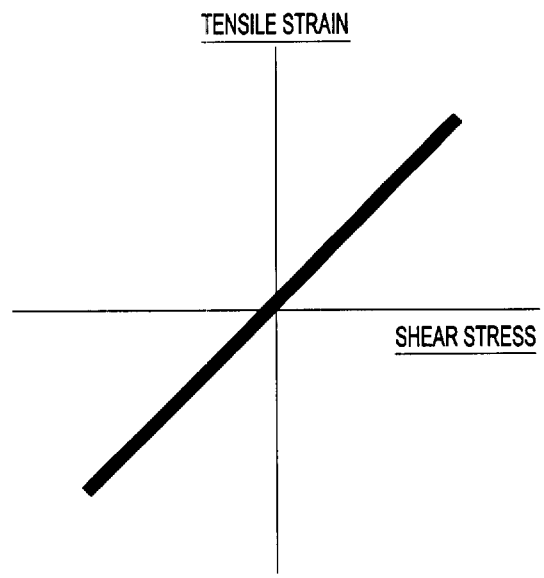
FIG. 4 is a graph showing a stress-strain curve for the machine element of FIGS. 2 and 3 along its transverse axis.

The behavior of a material including a plurality of these machine elements 12 is best explained in light of FIGS. 3 and 4. When the material is subjected to shear forces 34, the planar portions 16, 18 will pivot about the transverse portions 20, 22, causing the transverse portions 20, 22 to become more perpendicular to the plane 24, and therefore increasing a height 32 of the machine element 12. Thus, the shear stress acting upon the material is transferred into tensile strain, as shown in FIG. 4, which results in a tensile force 36 being applied substantially perpendicular to the plane 24, as shown in FIG. 3.

A composite material including a plurality of these "Z" shaped machine elements may be incorporated into a number of useful articles, such as the clamping mechanism 50 shown in FIG. 14. The clamping mechanism 50 may include a pair of opposing jaws 52 which have a pad 54 applied along their inner surfaces 56. The pad 54 is formed from a composite material in accordance with the present invention, i.e., including a plurality of "Z" shaped machine elements embedded in a matrix and arranged such that their planar portions are substantially parallel to the inner surfaces 56. The jaws 52 my be opened to receive an article 58 and then closed upon the article 58 to substantially grip it with the clamping mechanism 50, as shown. The clamping mechanism 50, in turn, is secured to a nearby structure, such as a floor or wall (not shown).

For example, the clamping mechanism 50 may be mounted in a bay of a space launch vehicle or in a ground transportation vehicle (not shown). As the vehicle moves, for example, during launch, the article 50 may be subjected to stress, such as vibration, which may tend to dislodge the article 58 from the jaws 52 of the clamping mechanism 50. Any force tending to pull the article 58 out of the jaws 52 results in a shear stress acting upon the pad 54. This causes the machine elements within the pad 54 to expand and apply a compressive force against the surrounding matrix material within the pad. Consequently, the force between the jaws 52 and the article 58 is increased, thereby increasing the strength with which the article 58 is gripped by the jaws 52.

In alternative applications, a composite material incorporating a plurality of "Z" shaped machine elements may be used as a damping material. The planar portions may deflect within the matrix to partially absorb forces, such as vibration. To further assist this application, the cavity 38 may be filled with a fluid other than air. For example, a viscous fluid may be sealed within the cavity 38 to further absorb energy.

Figure 6:
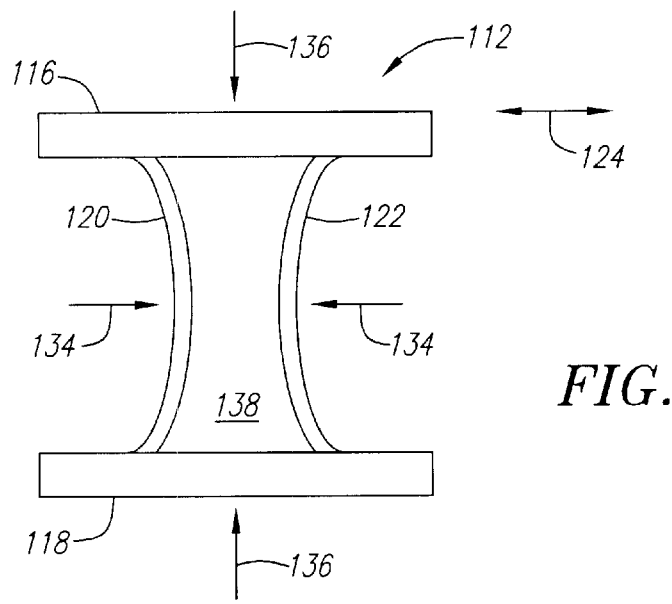
FIG. 6 is a cross-sectional view of another embodiment of a machine element having an hourglass shaped cross-section, for use in a composite material in accordance with the present invention.

Turning to FIG. 6, a cross-section of another preferred embodiment of a machine element 112 is shown that includes a pair of opposing planar portions 116, 118 connected by transverse portions 120, 122. The transverse portions 120, 122, which are semi-rigid or flexible, have a curved shape, thereby defining a generally hourglass-shaped cavity 138 within the machine element 112.

When the planar portions 116, 118 are subjected to compressive stress, such as by compressive forces 136, the transverse portions 120, 122 may bend and bow inwards into the cavity 138. Thus, the forces 136 may be converted into tensile/compressive forces 134 acting laterally. The bowing in of the transverse portions 120, 122 may cause the surrounding matrix material to move laterally in towards the cavity 138 from either side, thereby resulting in an overall decrease in the width of the composite material.

Thus, a compressive force, which may reduce the overall thickness of the composite material, may cause the width of the material also to decrease. This property is known as Poisson's Ratio, i.e., the ratio of the increase in width resulting from a reduction in thickness caused by forces acting on a material. Thus, unlike traditional materials, which have a positive Poisson's Ratio, a composite material incorporating these machine elements 112 may exhibit a negative Poisson's Ratio, because the width is decreased by a compressive force reducing the thickness, rather than increased, as in traditional materials.

A composite material incorporating these hourglass-shaped machine elements may be used in applications where a negative Poisson's Ratio may be useful, for example, in seals.

Figure 7A:
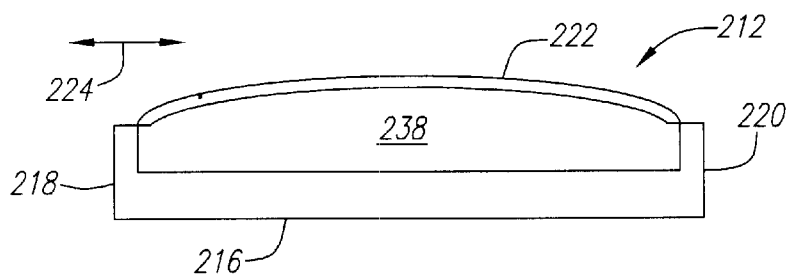
FIGS. 7A and 7B are cross-sectional views of still another embodiment of a machine element having a collapsible convex cross-section for use in a composite material, shown in its convex and concave configurations, respectively.
Figure 7B:
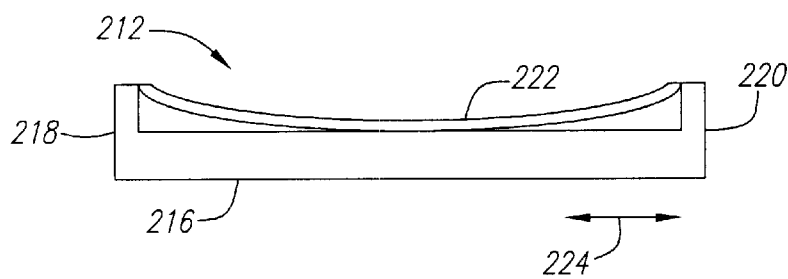

Turning to FIGS. 7A and 7B, a cross-section of another preferred embodiment of a machine element 212 is shown which includes a base portion 216 extending substantially parallel to plane 224 and a pair of upright legs 218, 220. Extending between the upright legs 218, 220 is a flexible, curved member 222 having a convex shape when it is free of stress, as shown in FIG. 7A. The base portion 216, legs 218, 220 and curved member 222 may be formed together as a single extrusion, or the curved member 222 may be a separate component attached to the legs 218, 220.

Figure 8:
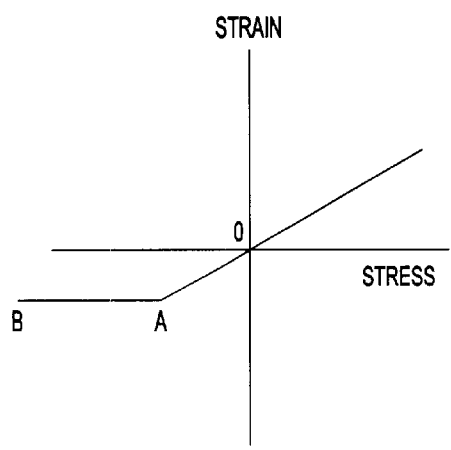
FIG. 8 is a graph showing a stress-strain curve for the machine element of FIGS. 7A and 7B along its transverse axis.

When the machine element 212 is subjected to compressive forces substantially perpendicular to the plane 224, the curved member 222 is compressed towards the base portion 216, thereby causing a negative strain in the material, as shown between points 0–A in the stress-strain curve of FIG. 8. As the forces are increased, the curved member 222 may ultimately yield at a predetermined force, invert and adopt a concave shape, as shown in FIG. 7B. Further forces applied to the individual machine element 212 will no longer deflect the curved member, as shown between points A–B in FIG. 8.

With respect to a composite material including a plurality of these machine elements 212, as the compressive stress on the composite material increases incrementally, more and more of the machine elements 212 may invert and adopt the concave shape. Consequently, the composite material will continue to strain at a relatively constant stress level until a great majority of the machine elements 212 have inverted and adopted the concave shape.

In a preferred form, the curved member 222 is biased to return to its convex shape, whereupon as the compressive force is removed from the material, the curved member 222 may evert or "pop" out to its convex shape. The curved member 222 may evert at point A in the curve of FIG. 8, or the curved member 222 may exhibit hysteresis and evert back to its convex shape at a point along line A–B. In alternative embodiments, a small spring structure (not shown) may be provided within the cavity 238, for example, at a midpoint of the base portion to further bias the curved member 222 back to its convex shape.

The machine element 212 may be useful as an energy-absorbing material. When compressive forces are applied to a composite material including a plurality of the machine elements 212, the curved members 222 may invert to their concave shape, absorbing energy. When the compressive forces are removed, the curved members 222 may evert back to their convex shape, thereby releasing the energy stored therein. In addition, a material including these machine elements 212 may exhibit linear elastic properties which are limited by a predetermined stress, i.e., the stress necessary to cause the curved members 222 to invert to their concave shape.

Figure 9:
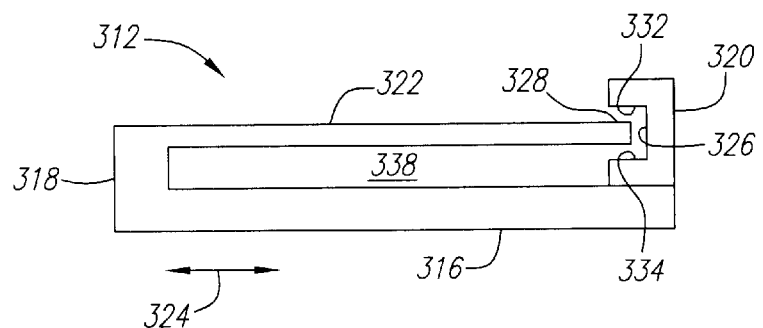
FIG. 9 is a cross-sectional view of still another machine element including a cantilever structure for use in a composite material in accordance with the present invention.

Turning to FIG. 9, a cross-section of still another preferred embodiment of a machine element 312 is shown that includes a base portion 316, upright legs 318, 320, and a cantilever portion 322. Preferably, the cantilever portion 322 extends from one leg 318 substantially parallel to the base portion 316. The other leg 320 includes a channel 326 therein within which a tip 328 of the cantilever portion 322 may freely move.

Thus, when the machine element 312 is subjected to compressive or tensile forces substantially perpendicular to plane 324, the cantilever portion 322 may deflect in relationship to the base portion 316. At a predetermined stress level, the tip 328 may abut a lower or upper ledge 334, 332, limiting the cantilever action of the cantilever portion 322. Any further increase in stress may result in the cantilever portion 322 deflecting as if it were a leaf spring with two fixed ends.

Figure 10:
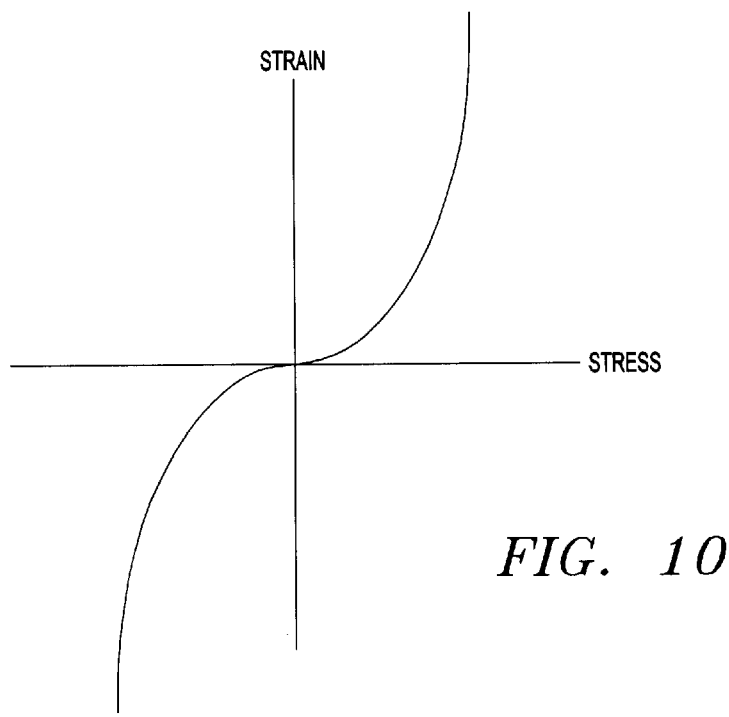
FIG. 10 is a graph showing a stress-strain curve for the machine element of FIG. 9 along its transverse axis.

As shown in FIG. 10, the stress-strain curve for this machine element 312 follows a nonlinear curve, exhibiting two separate sets of physical properties, depending upon whether the cantilever portion 322 is behaving like a cantilever beam or a leaf spring. These sets of physical properties may be selected to respond to particular conditions encountered by a composite material including the machine elements 312 therein. For example, the machine elements 312 may be designed to respond to mixed frequencies, for example, of sound or shock waves. Certain frequencies may be absorbed by the material and others passed through. Thus, potentially damaging frequencies may be eliminated to protect the material, the article made from the material or other systems in proximity to the material.

Figure 11:
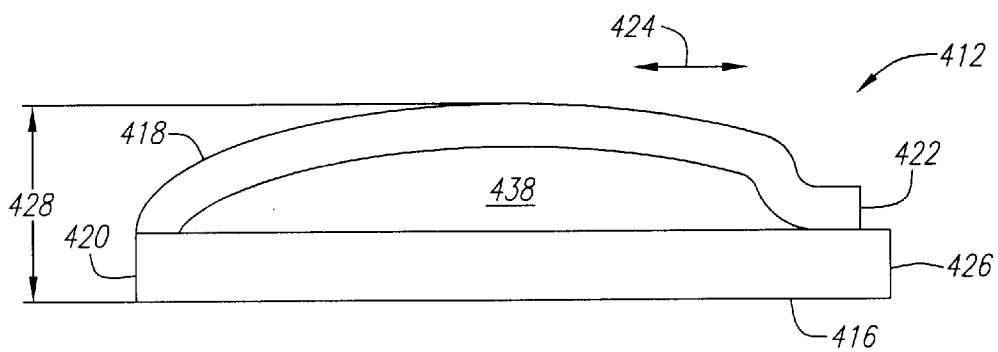
FIG. 11 is a cross-sectional view of still another machine element including a leaf spring structure for use in a composite material in accordance with the present invention.

Turning to FIG. 11, a cross-section of yet another preferred embodiment of a machine element 412 is shown that includes a base portion 416 and a leaf spring portion 418 attached to one end 420 of the base portion. The leaf spring portion 418 has a generally convex shape and extends generally along the base portion 416 until its free end 422 abuts the base portion 416 proximate to its other end 426. The base portion 416 is preferably substantially rigid, while the leaf spring portion 418 is semi-rigid, thereby being deflectable in relation to the base portion 416 when the machine element 412 is subjected to forces generally perpendicular to plane 424.

For example, when the machine element 412 is subjected to compressive forces, the leaf spring portion 418 may be deflected towards the base portion 416, thereby reducing a thickness 428 of the machine element 412, and consequently, the overall thickness of a composite material incorporating the machine element 412 therein. Similarly, tensile forces may cause the spring leaf portion 418 to deflect away from the base portion 416, thereby increasing the thickness 428. Thus, a designer may control the stiffness of the resulting composite material by selecting the dimensions of the leaf spring in a predetermined manner, for example, to give an increased strain to failure.

While embodiments of the present invention have been shown and described, various modifications may be made without departing from the scope of the present invention, and all such modifications and equivalents are intended to be covered.

I claim:

1. A composite material, comprising:
   a matrix material; and
   a plurality of machines disposed in the matrix material having an elongate shape defining an axis and an asymmetrical cross-section, the plurality of machines acting to modify one or more physical properties of the composite material in response to forces acting upon the composite material.

2. The composite material of claim 1, wherein the plurality of machines are independently suspended within the matrix material.

3. The composite material of claim 1, wherein the machines have a maximum cross-sectional dimension which is less than about 1 centimeter.

4. The composite material of claim 3, wherein the maximum cross-sectional dimension is more than about 100 microns.

5. The composite material of claim 1, wherein the plurality of machines act to modify one or more physical properties of be composite material in a direction substantially transverse to the longitudinal axis.

6. The composite material of claim 1, wherein the one or more physical properties comprises Poisson's ratio.

7. The composite material of claim 1, wherein the plurality of machines are deflectable for transferring a force acting upon the composite material between a tensile/compressive condition and a shear condition.

8. The composite material of claim 1, wherein the plurality of machines comprise an array of deflectable members arranged within the matrix material, one or more of the deflectable members deflecting within the matrix material when the composite material is subjected to stress.

9. The composite material of claim 8, wherein the deflectable members comprise a transverse portion extending between opposing planar portions.

10. A sheet of composite material defining a plane and having a thickness, the sheet comprising:
    a matrix material; and
    a plurality of machine elements disposed in the matrix material having an elongate shape defining an axis and an asymmetrical cross-section, the machine elements having a width dimension substantially parallel to the plane, the width dimension being less than about 10% of the thickness of the sheet.

11. The sheet of claim 10, wherein the width dimension is less than about 1% of the thickness of the sheet.

12. The sheet of claim 10, wherein the machine elements comprise less than about 50% by volume of the sheet.

13. The sheet of claim 10, wherein the matrix material comprises a resin selected from the group consisting of epoxy, vinylester and polyester.

14. The sheet of claim 10, wherein the machine elements comprise polyvinyl chloride or nylon extrusions.

15. A composite material, comprising:
    a matrix material; and
    a plurality of machines disposed in the matrix material, the plurality of machines acting to modify one or more physical properties of the composite material in response to forces acting upon the composite material;
    wherein the plurality of machines comprise an array of deflectable members arranged within the matrix material, one or more of the deflectable members deflecting within the matrix material when the composite material is subjected to stress;
    wherein the deflectable members comprise a transverse portion extending between opposing planar portions; and
    wherein the opposing planar portions are movable relative to one another about the transverse portion.

16. A composite material comprising:
    a matrix material; and
    a plurality of machines disposed in the matrix material, the plurality of machines acting to modify one or more physical properties of the composite material in response to forces acting upon the composite material;
    wherein the plurality of machines comprise an array of deflectable members arranged within the matrix material, one or more of the deflectable members deflecting within the matrix material when the composite material is subjected to stress;
    wherein the deflectable members comprise a transverse portion extending between opposing planar portions; and
    wherein the opposing planar portions and transverse portion define a substantially "Z" shape.

17. A composite material, comprising:
    a matrix material; and
    a plurality of machines disposed in the matrix material, the plurality of machines acting to modify one or more physical properties of the composite material in response to forces acting upon the composite material;
    wherein the plurality of machines comprise an array of deflectable members arranged within the matrix material, one or more of the deflectable members deflecting within the matrix material when the composite material is subjected to stress;
    wherein the deflectable members comprise a transverse portion extending between opposing planar portions; and
    wherein the transverse portion comprises a pair of connector portions extending between the opposing planar portions.

18. The composite material of claim 17, wherein the connector portions are curved.

19. A composite material, comprising:
    a matrix material; and a plurality of machines disposed in the matrix material, the plurality of machines acting to modify one or more physical properties of the composite material in response to forces acting upon the composite material;

wherein the plurality of machines comprise an array of deflectable members arranged within the matrix material, one or more of the deflectable members deflecting within the matrix material when the composite material is subjected to stress; and wherein the deflectable members comprise a base portion and a convex portion extending from the base portion, the convex portion being deflectable to a concave shape.

20. A composite material, comprising:

a matrix material; and a plurality of machines disposed in the matrix material, the plurality of machines acting to modify one or more physical properties of the composite material in response to forces acting upon the composite material;

wherein the plurality of machines comprise an array of elongate members disposed in the matrix material substantially parallel to a longitudinal axis, the elongate members having an asymmetrical cross-section that is deflectable between first and second shapes, the composite material exhibiting different physical properties as the elongate members deflect between the first and second shapes.

21. The composite material of claim 20, wherein the array of elongate members are disposed within the matrix material in a plane, and wherein each elongate member comprises a pair of opposing planar portions arranged substantially parallel to the plane, the opposing planar portions being moveable relative to one another within the matrix material.

22. The composite material of claim 21, wherein each elongate member further comprises one or more connecting portions extending between the opposing planar portions, the connecting portions limiting relative movement of the opposing planar portions within the matrix material.

23. The composite material of claim 20, wherein the elongate members have a substantially "Z" shaped cross-section for transferring a force acting upon the composite material between a tensile/compressive condition and a shear condition.

* * * * *